United States Patent [19]

Henderson

[11] Patent Number: 5,535,883
[45] Date of Patent: Jul. 16, 1996

[54] INSULATED BEVERAGE BOX FOR GOLF CARTS

[76] Inventor: Donald C. Henderson, H-C-65 Box 41, #5 Elm St., Cloudland, Ga. 30731

[21] Appl. No.: 344,952

[22] Filed: Nov. 25, 1994

[51] Int. Cl.$^6$ .................................. B65D 65/00
[52] U.S. Cl. .................. 206/427; 206/139; 62/457.2; 62/457.5; 220/523; 220/526
[58] Field of Search .................. 206/139, 201, 206/202, 545, 549, 427; 62/457.2, 457.4, 457.5; 220/523, 526, 525, 553, 555

[56] References Cited

U.S. PATENT DOCUMENTS

| | | | |
|---|---|---|---|
| 3,387,650 | 6/1968 | Hoffmann et al. | 62/457.2 |
| 4,050,264 | 9/1977 | Tanaka | 62/457.2 |
| 4,238,934 | 12/1980 | Hotta | 62/457.2 |
| 4,319,629 | 3/1982 | Hotta | 62/457.2 |
| 4,498,312 | 2/1985 | Schlosser | 62/457.2 |
| 4,688,398 | 8/1987 | Baek | 62/457.2 |
| 4,738,363 | 4/1988 | Hudson | 206/427 |
| 4,765,476 | 8/1988 | Lee . | |
| 4,796,758 | 1/1989 | Hauk | 206/545 |
| 4,802,344 | 2/1989 | Livingston et al. | 62/457.2 |
| 4,812,793 | 4/1989 | Willard et al. | 62/457.5 |
| 4,978,023 | 12/1990 | Behlmann et al. | 206/545 |
| 5,005,679 | 4/1991 | Hjelle . | |
| 5,007,250 | 4/1991 | Musielak | 62/457.5 |
| 5,095,718 | 3/1992 | Ormond et al. . | |
| 5,421,172 | 6/1995 | Jones | 62/457.5 |
| 5,423,426 | 6/1995 | Harper | 206/545 |

*Primary Examiner*—David T. Fidei
*Attorney, Agent, or Firm*—Hardaway Law Firm

[57] ABSTRACT

An insulated beverage box is provided which is compatible with standard golf cart baskets and is designed to minimize problems of poor fit and excessive movement of current beverage box designs. The beverage box provides a plurality of chambers for the storage of various beverages and provides an accessible spigot for the dispensing of liquid beverages.

4 Claims, 3 Drawing Sheets

5,535,883

INSULATED BEVERAGE BOX FOR GOLF CARTS

BACKGROUND OF THE INVENTION

Playing a round of golf typically takes an extended amount of time. Accordingly, the pair will usually desire to have some type of beverage with them for consumption while playing their round. However, while two golfers can consume a large amount beverage, especially on a hot day, a golf cart, in general, has limited storage space. Therefore, there is no space for storing a large amount of beverage and a cooler for keeping the beverage cold.

All golf carts have a basket thereon for storing various items. These baskets vary in size from one golf cart manufacturer to another and, to date, there is no cooler that will both: (1) hold a large amount of beverage containers and (2) snugly fit within these conventional baskets to prevent substantial shaking of the beverages.

Accordingly, there is room for improvement within the art.

OBJECTS OF THE INVENTION

It is therefore an object of the invention to provide a insulated beverage box that fits into a conventional golf cart basket.

It is a further object of the invention to provide a insulated beverage box that can also be used independently of the golf cart, such as by carrying it around by a strap.

It is yet a further object of the invention to provide an insulated beverage box that fits into the golf cart basket in such a way as to reduce the amount of shaking that the beverages are subject to while the cart is moving.

It is yet a further and more particular object of this invention to provide a beverage container with a dispenser suitable for use with bulk liquids.

It is yet a further and more particular object of this invention to provide a beverage container with a dispenser, the dispenser in communication with an internal chamber designed to hold bulk liquids with the adjacent container space serving as a traditional cooler.

These and other objects of the invention are achieved by: an insulated beverage box for placement in a golf cart basket having two wire side panels, a wire front panel, a wire rear panel, and a wire bottom, said front and rear panels extending upwardly and outwardly from said wire bottom, and having inner surfaces, the box comprising:

a bottom, the bottom having substantially the same depth as the wire bottom;

two side walls;

a front wall and a rear wall, the front and rear walls extending upwardly and outwardly from the box bottom, the front and rear walls being parallel to the front and rear panels and in contact with the inner surfaces of the front and rear panels, respectively;

a dispenser in communication with an interior beverage chamber, a control mechanism and an outlet of the dispenser being carried through a panel of the basket, the box further defining an additional chamber adjacent the beverage chamber; and, wherein when the insulated box is placed in the basket the insulated box cannot rock in a front-back direction and the control mechanism and the outlet of the dispenser projects through a panel of the basket.

DETAILED DESCRIPTION OF THE INVENTION

In accordance with this invention, it has been found that a insulated beverage box for a golf cart that fulfills the objects set forth above can be formed according to the invention and will be better understood from a reading of the following description given with reference to the various drawings.

Figure 1:
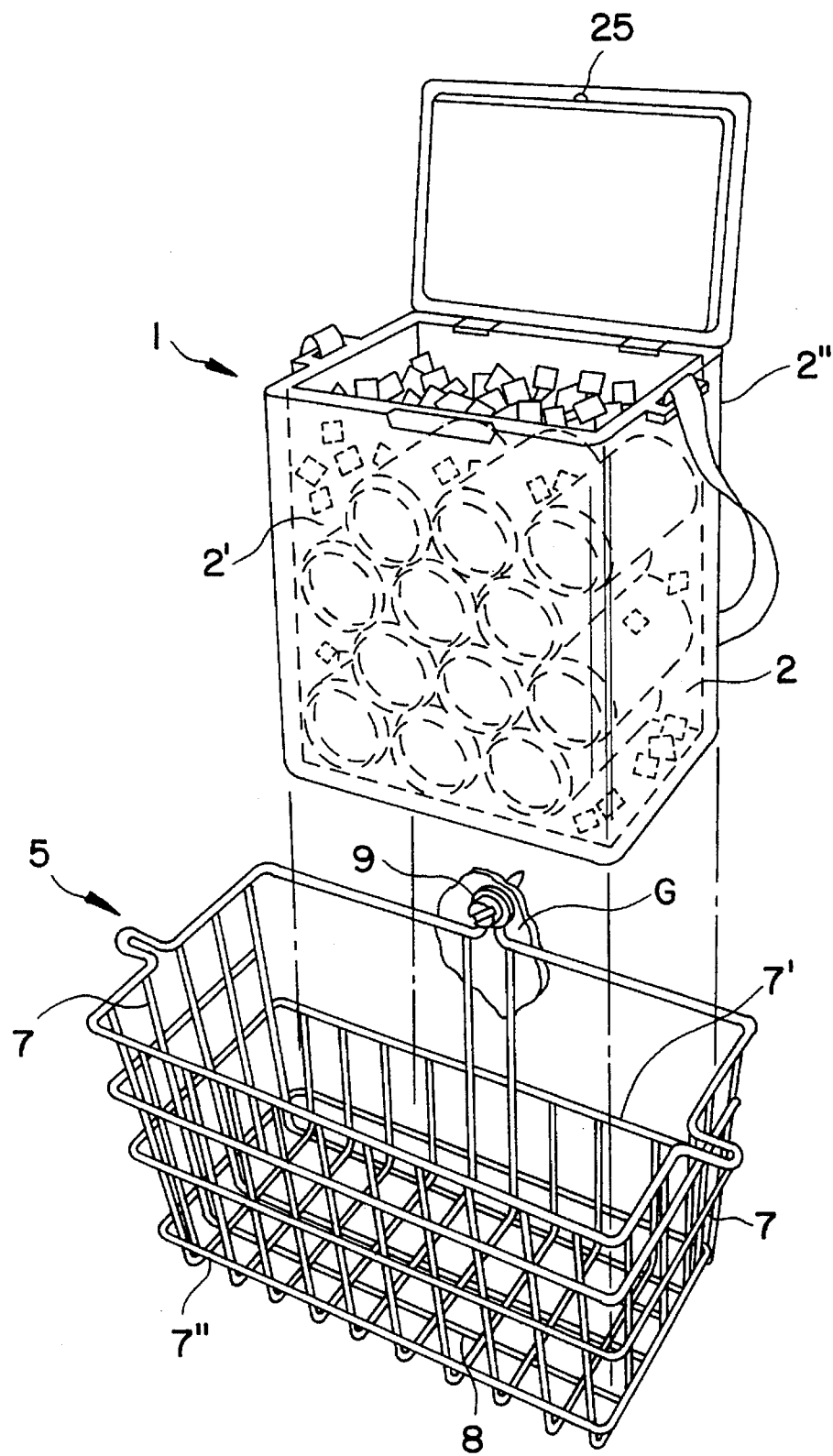
FIG. 1 is a perspective view showing an insulated beverage box according to the invention in relation to a golf cart basket.

FIG. 1 is a perspective view showing an insulated beverage box 1 in relation to a golf cart basket 5. Basket 5 has two wire side panels 7, wire front and rear panels 7', 7", and wire bottom 8. Basket 5 is mounted to golf cart G by fastener 9. Typically, all golf carts have a basket 5 mounted thereto. As shown in FIG. 1, the shape of these baskets typically comprises wherein each wire panel has a generally trapezoidal shape and extends upwardly and outwardly from wire bottom panel 8 so as to have the shape of an inverted hollow trapezoidal solid. All the panels 7, 7', and 7", and bottom panel 8, have inner surfaces inside the basket for potentially contacting and supporting box 1, as will be described below.

Box 1 has two planar side walls 2, front and rear walls 2', 2", and bottom wall 3. Bottom wall 3 will have substantially the same depth as basket 5. Thus, bottom wall 3 will be as deep as the distance between front panel 7' and rear panel 7", where they are attached to bottom panel 8. Front and rear walls 2', 2" may also be trapezoidal-shaped and have the same length as panels 7', 7", however, they will extend upwardly and outwardly from bottom wall 3 at the same angle with, and thus parallel to, front panel 7' and rear panel 7", to form an inverted solid that fits precisely and snugly between front panel 7' and rear panel 7", within basket 5. When box 1 is within basket 5, because of this precise and snug fit wherein: front wall 2' will be in full contact with front panel 7', rear wall 2" will be in full contact with wire panel 7", and bottom wall 3 will rest on wire bottom 8, there will be no front to back rocking of box 1 when the golf cart starts and stops. This greatly reduces the shaking that insulated box 1 and the beverages therein are subject to during movement of the golf cart. It is also possible, using the concepts described herein, to have box 1 entirely conform to the inner dimensions of basket 5 and thus be incapable of any side-to-side or front-to-rear movements. While this will reduce, even more, the amount of shaking that insulated box 1 and the beverages therein are subject to, this also removes any left-over storage space in the basket for things such as golf-balls or club-head covers. Of course, box 1 may be, and usually is, taller than basket 5, depending upon the amount of beverage to be contained therein and to permit the hinged lid to open while box 1 is engaged within basket 5. Finally, it is possible that at least one of the side walls 2 of box 1 be trapezoidal-shaped and extend upwardly and outwardly from bottom wall 3 such that wall 2 will be entirely in contact with its corresponding side panel 7 and, thus, the insulated box, will snugly supported on three sides and the bottom.

As shown in FIG. 1, insulated box 1 is capable of containing therein a complete 12-pack of beverage cans, as well as ice to keep the beverage cold. It is foreseen that by increasing the height of insulated box 1, it is also possible to contain a plurality of tall wine or champagne bottles therein. This gives the golfer maximum flexibility as to beverage choices.

Figure 2:
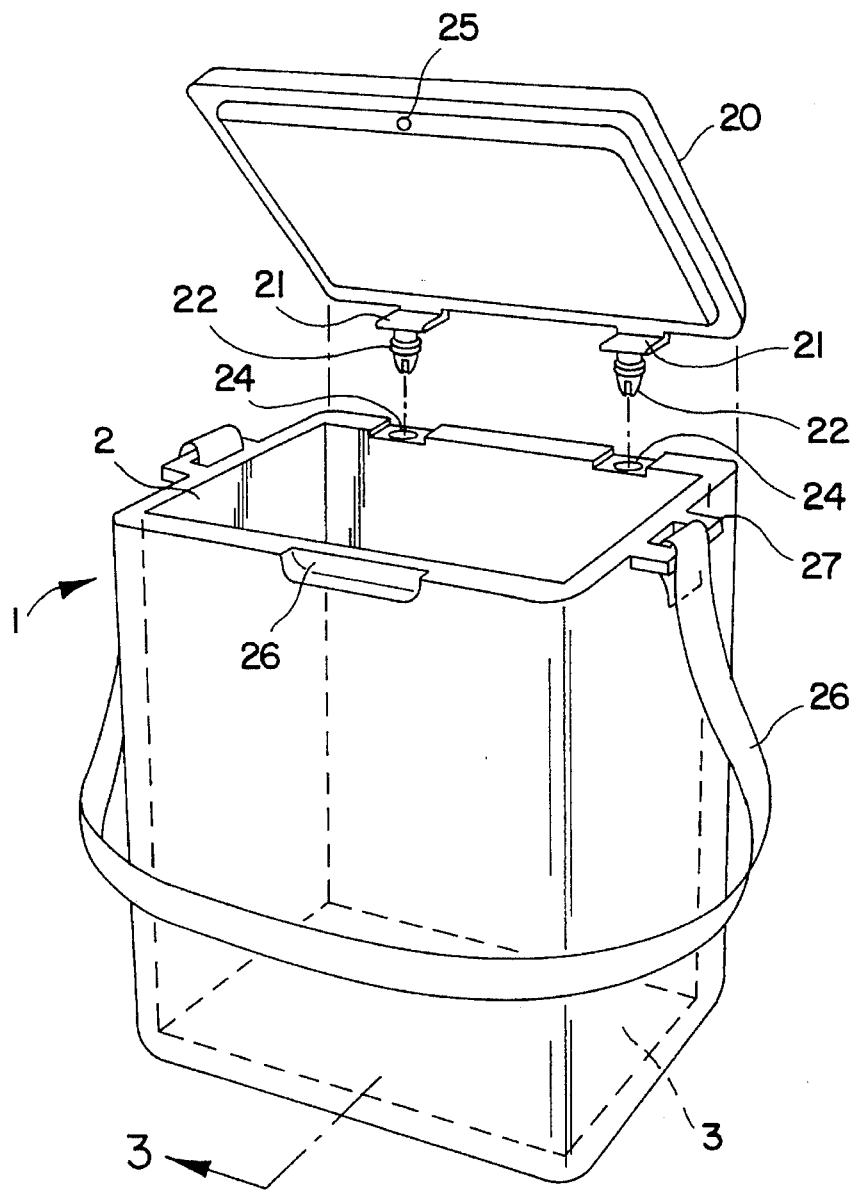
FIG. 2 is a perspective view showing details of the insulated beverage box according to the invention.

FIG. 2 shows other details of insulated box 1. Box 1 includes an insulated lid 20 having lid plug 23 for sealing insulated box 1. Insulated box 1 also has molded thereto two unitary living hinges 21 having barbed plugs 22. Barbed plugs 22 fit within sockets 24 of one of the walls 2. To maintain lid 20 in a closed configuration, ball latch 25, mounted on lid plug 23, mates the inside of front wall 2. Finger notch 26 allows for easy opening of lid 20 by the golfer. For carrying to and from the cart, box 1 has a shoulder strap 26. Shoulder strap 26 may be, for example, heat sealed around loops 27 molded to the side walls of the box 1.

Figure 3:
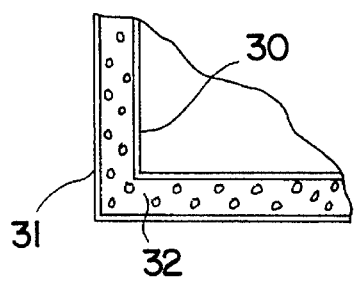
FIG. 3 is an elevational cutaway view of a portion of the insulated beverage box according to the invention.

FIG. 3 shows a cross section of insulated box 1. In particular, dense inner and outer skins 30 and 31, respectively form a sandwich around insulating foam 32. This structure prevents environmental heat from warming the beverage within insulated box 1.

Figure 4:
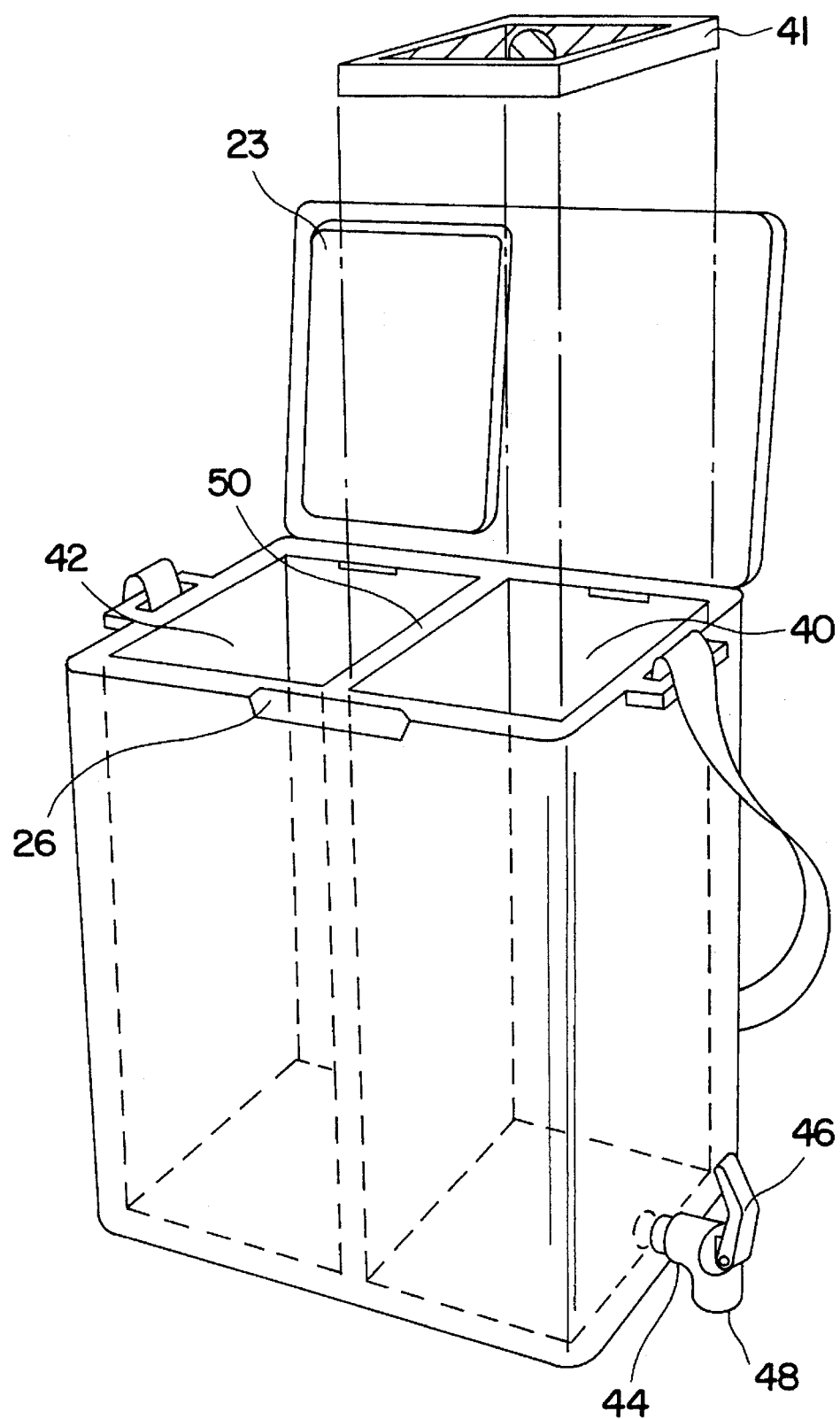
FIG. 4 is a perspective view of an additional embodiment of the invention with additional details indicated in phantom.

FIG. 4 shows a perspective view similar to that seen in FIG. 2 and showing an additional embodiment of the invention. A dispenser 44 with a control mechanism 46 is provided, the dispenser being in communication with the interior of the insulated box and providing an outlet 48 through which beverages can be dispensed. A variety of well-known dispensing valves can be employed such as a spigot with a push button control valve or a rotating member which controls the beverage flow.

In this current embodiment, the box 1 may be used to house bulk liquids, such as iced tea, lemonade, and similar beverages. Lid plug 23 provides a sufficiently tight seal such that the closed lid prevents the loss of the bulk liquids from the closure as the liquid is agitated during transport.

An additional feature of the present invention is provided by a separate dispensing chamber housed inside box 1. As seen in FIG. 4, the interior of insulated box 1 can define a first dispensing chamber 40 in communication with dispenser 44. An insulated reclosable, sealing chamber lid 41 is provided at the top of chamber 40. Removing lid 41 permits the introduction of a liquid beverage into chamber 40 which is then secured therein by the chamber lid 41. Chamber 40 and lid 41 are designed to fit within the interior of closed box 1.

The second, adjacent chamber 42 and Lid Plug 23 can continue to function as a traditional cooler, the cooled products and ice in chamber 42 providing a way of cooling and maintaining a desired temperature of the beverage contents of chamber 40. While dispensing chamber 40 is illustrated as being defined by a straight partition 50 which separates the interior portion of the two chambers, the dispensing chamber size and dimensions can be varied by adjusting the shape, including height, of the partition wall(s). By providing well-insulated partition walls, it is possible to provide a dispensing chamber 40 which can house and dispense heated beverages such as coffee while the adjacent insulated chamber 42 functions as a traditional cooler, carrying iced beverages. This feature increases the versatility of the insulated box 1 by allowing a beverage choice between hot and cold products.

It is preferable that the dispenser 44 be located along a side wall 2, in proximity to bottom wall 3, or along an outside corner formed by a wall 2 and front wall 2'. This permits the box 1 to be placed inside of basket 5 and positioned so that the dispenser control member 46 and dispenser outlet 48 are located external to the wire basket 5. This placement allows the dispenser to be used without removing the box and provides storage space within the basket adjacent the nondispensing side of the box 1.

The above description is given in reference to an insulated beverage box for a golf cart. However, it is understood that many variations are apparent to one of ordinary skill in the art from a reading of the above specification and such variations are within the spirit and scope of the instant invention as defined by the following appended claims.

That which is claimed:

1. An insulated beverage container comprising:
    an insulated rigid housing defining a receptacle, said housing further defining a bottom, four side walls, and a hinged top;
    a partition traversing said receptacle and in communication with said bottom and at least two of said side walls, thereby forming a first and a second insulated chamber;
    a plug having dimensions to engage an upper opening of said first chamber, said plug carried by a lower surface of said hinged top;
    a removable lid engaging an upper opening of said second chamber; and,
    a dispenser in fluid communication with an interior of said second chamber;
    wherein said beverage container provides an insulated dispensing portion for hot or cold liquids and an adjacent insulated storage portion for additional insulated items.

2. The container according to claim 1 wherein said side walls are trapezoidal-shaped, thereby facilitating the firm engagement of the container by varying sized rectangular holders.

3. The container according to claim 1 wherein said lid forms a liquid tight seal with said second chamber.

4. The container according to claim 1 wherein said plug forms a liquid tight seal with said first chamber.

* * * * *